Dec. 15, 1970   R. S. HAHN   3,547,795
APPARATUS FOR THE GENERATION OF A SURFACE OF REVOLUTION
BY THE ELECTRO-CHEMICAL PROCESS
Filed Oct. 2, 1967   4 Sheets-Sheet 1

ROBERT S. HAHN
INVENTOR.

BY

Dec. 15, 1970  R. S. HAHN  3,547,795
APPARATUS FOR THE GENERATION OF A SURFACE OF REVOLUTION
BY THE ELECTRO-CHEMICAL PROCESS
Filed Oct. 2, 1967  4 Sheets-Sheet 2

ROBERT S. HAHN
INVENTOR.

BY
Norman J. Blodgett

United States Patent Office 3,547,795
Patented Dec. 15, 1970

3,547,795
APPARATUS FOR THE GENERATION OF A SURFACE OF REVOLUTION BY THE ELECTROCHEMICAL PROCESS
Robert S. Hahn, Northboro, Mass., assignor to The Heald Machine Company, Worcester, Mass., a corporation of Delaware
Filed Oct. 2, 1967, Ser. No. 676,668
Int. Cl. C23b 5/68
U.S. Cl. 204—212                                    9 Claims

ABSTRACT OF THE DISCLOSURE

This invention relates to an apparatus for the generation of a surface of revolution by the electro-chemical process and, more particularly, to apparatus arranged to remove metal and finish the surface of an internal bore of a desired size and quality.

A great many investigators throughout the world have been working on electro-chemical machining, commonly known as "ECM," not only for cavity-sinking processes, but also for outside diameter and inside diameter machining processes. Some of the advantages of the ECM methods are that the electrode shows no wear and, in a machining operation, it is not necessary to provide a "compensation" mechanism as is necessary in internal grinding, for instance, where the effect of diamond dressing and diamond wear must be provided for. In some grinding operations, particularly in the grinding of small diameter internal bores, it is necessary, at the present time, to provide high speed grinding spindles in order to grind at the optimum surface speed. In the past, however, ECM machining has been too slow to provide for "rounding up" in connection with the finishing of internal bores. In general, it might be said that the ECM method of machining has been too slow to permit its use as a replacement for internal grinding. These and other difficulties experienced with the prior art devices have been obviated in a novel manner by the present invention.

OBJECTS

It is, therefore, an outstanding object of the invention to provide an apparatus for the generation of a surface of revolution by the electro-chemical process using an inertia dominated system.

Another object of this invention is the provision of an apparatus for ECM machining which is simple in construction, and which is particularly fast acting in the case of finishing of internal bores.

A further object of the present invention is the provision of an apparatus for ECM machining which is simple in construction, which is inexpensive to manufacture, and which is capable of a long life of useful service with a minimum of maintenance.

It is another object of the instant invention to provide an apparatus for ECM generation of bores which is capable of rounding up bores without placing physical stress on the workpiece.

It is a further object of the invention to provide an apparatus for finishing internal bores, which requires no compensation for diamond dressing and diamond wear, and operates at a slow speed of rotation.

With these and other objects in view, as will be apparent to those skilled in the art, the invention resides in the combination of parts set forth in the specification and covered by the claims appended hereto.

DESCRIPTION OF THE INVENTION

Figure 1:
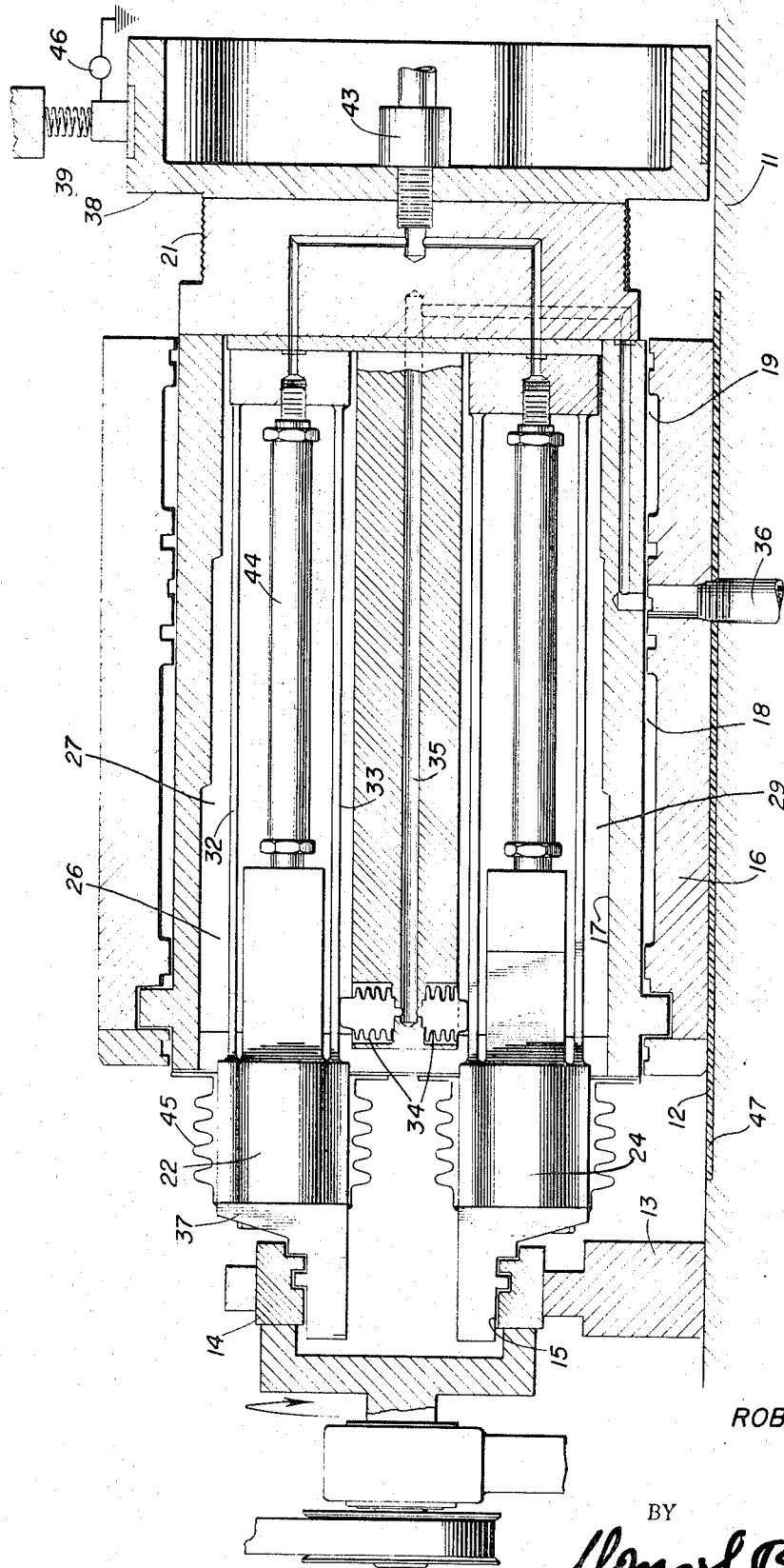
Figure 2:
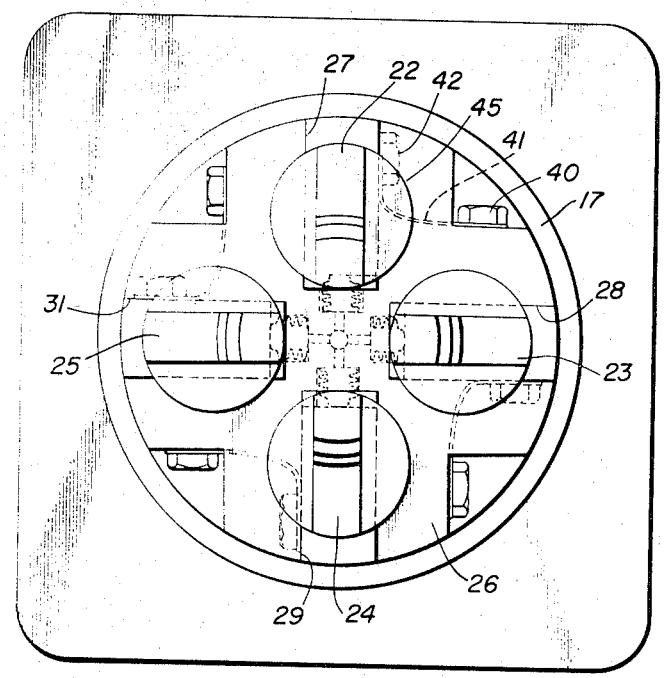
Figure 3:
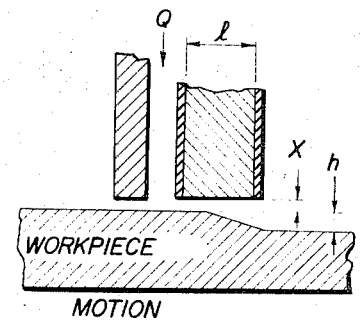
Figure 4:
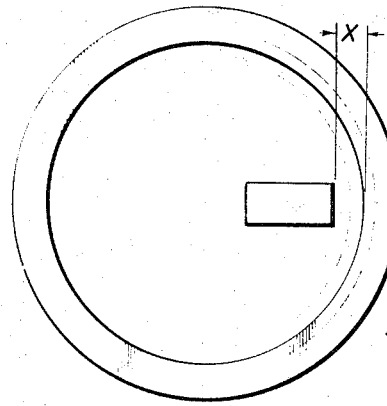
Figure 5:
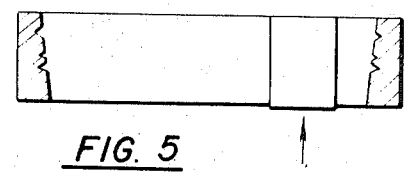
Figure 6:
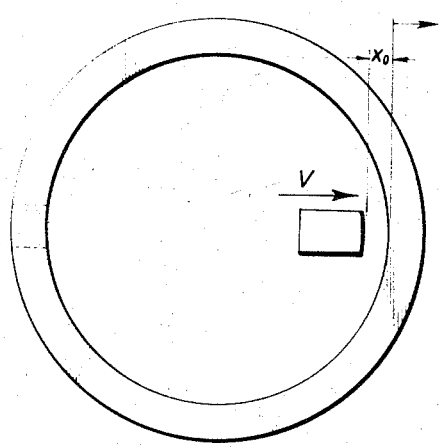
Figure 7:
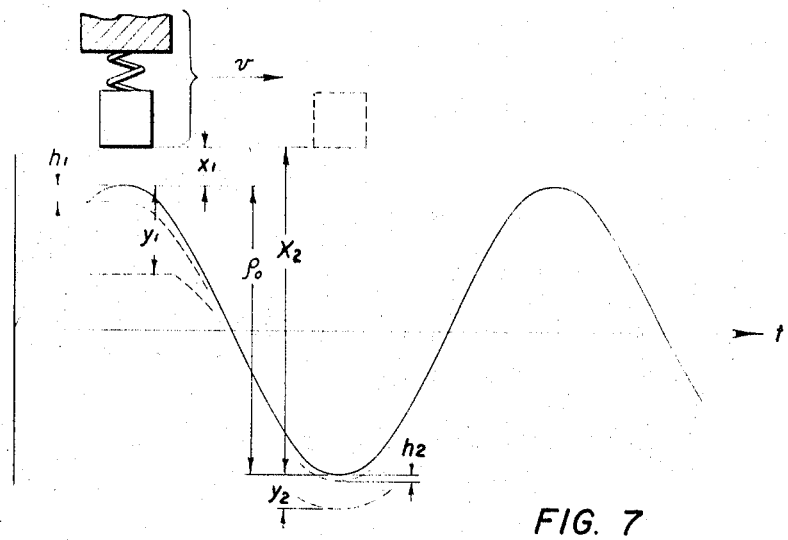
Figure 8:
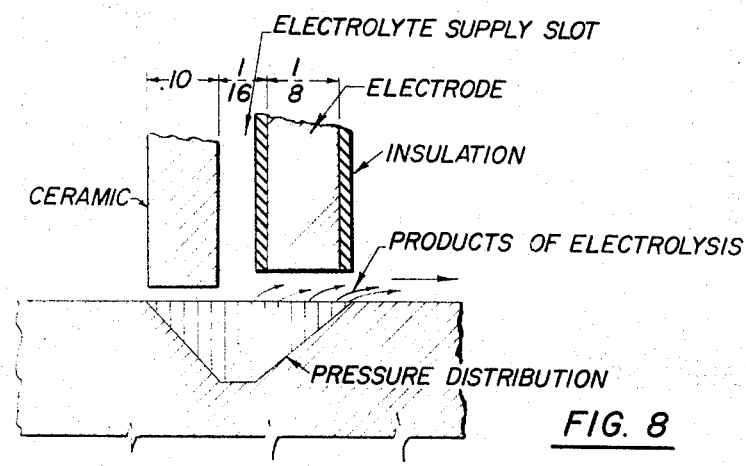
Figure 9:
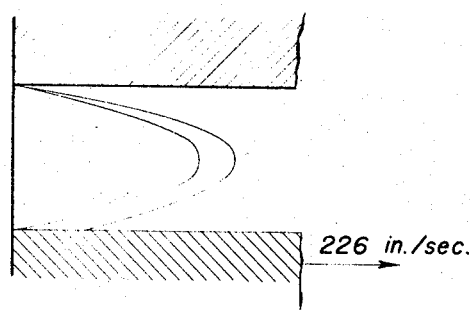
Figure 10:
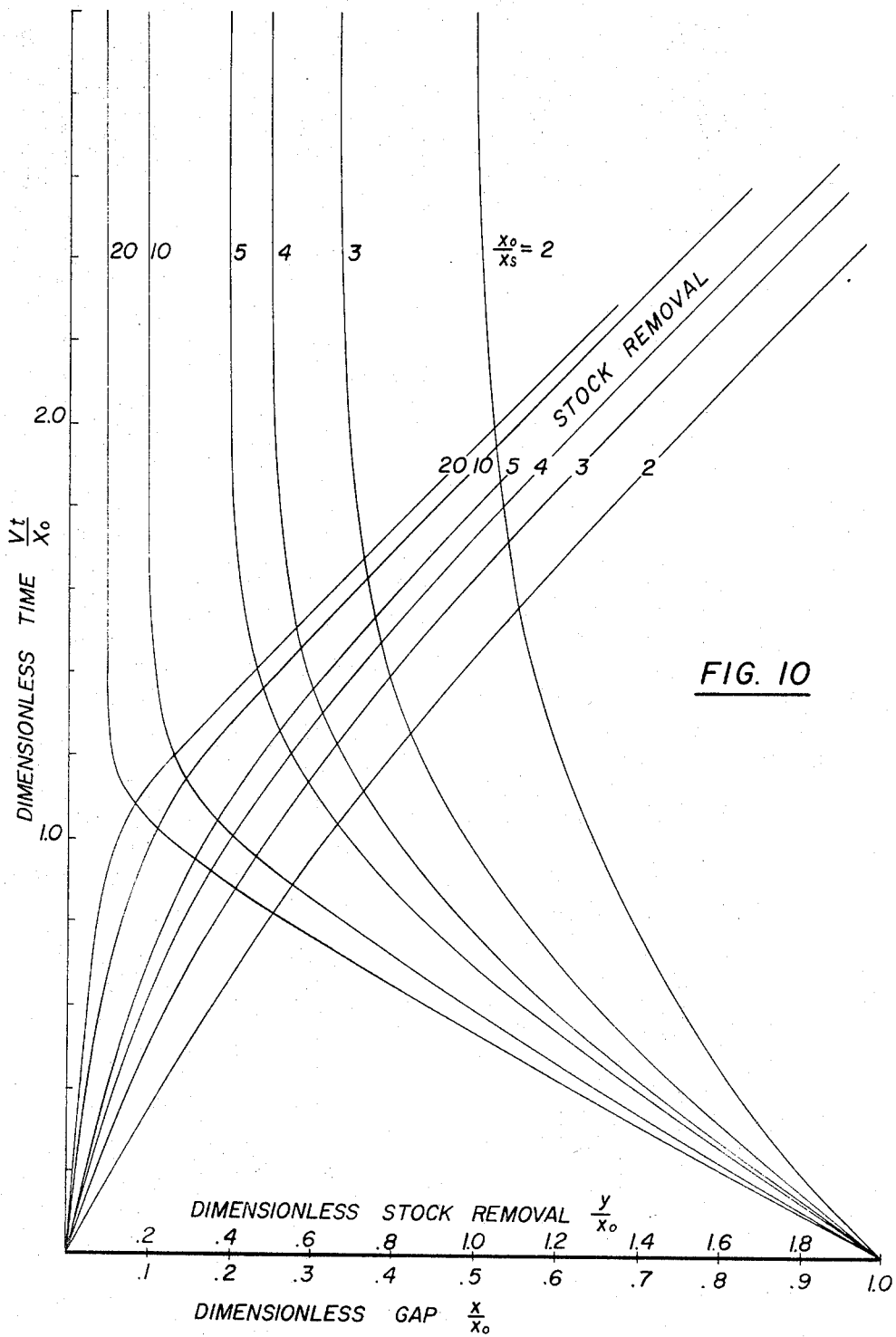

The character of the invention, however, may be best understood by reference to one of its structural forms, as illustrated by the accompanying drawings in which:

FIG. 1 is a vertical sectional view of an apparatus embodying the principles of the present invention,
FIG. 2 is an end elevation of the apparatus,
FIG. 3 is a schematic view of an ECM machining process,
FIG. 4 is an end view of an annular workpiece,
FIG. 5 is a sectional view of a workpiece,
FIG. 6 is an end view of a workpiece,
FIG. 7 is a graphical representation of the ECM machining process,
FIG. 8 is a schematic view of the electrolytic machining process,
FIG. 9 is a graph of velocity distribution experienced in the electrolyte, and
FIG. 10 is a graph of gap vs. time.

Referring first to FIGS. 1 and 2 of the drawings, which best show the general features of the invention, it can be seen that the apparatus, indicated generally by the reference numeral 10, comprises a base 11 which, as in most machine tools, is firmly fastened to the floor and is provided with a horizontal upper surface 12. On this surface is mounted a workhead 13 carrying a workpiece 14 having an internal bore 15 which is to be finished. Also mounted on the base 11 is a tool head 16 rotatably carrying a spindle 17 in hydrostatic bearings 18 and 19. One end of the spindle is provided with a pulley 21 adapted to be connected by a belt to a motor for the rotation of the spindle. Mounted on the spindle are four electrode systems including four electrodes 22, 23, 24, and 25. These electrodes are mounted on the spindle in an equally-spaced group lying on an imaginary cylindrical surface concentric with the axis of the workpiece and of the spindle 17. Mounted in the spindle is a large copper block 26 formed with slots 27, 28, 29, and 31 in which the electrodes are slidable. As is evident in FIG. 1, the electrode 22 is connected to the right-hand end of the spindle through reeds 32 and 33, thus permitting it to move radially of the centerline. The other electrodes are similarly mounted and are provided with a plurality of pneumatic linear actuators such as bellows 34. These bellows are connected to a passage 35 through the spindle which is connected by secondary passages to an inert port 36 formed in the tool head 16 to receive air under pressure for the radial operation of the electrodes. The electrode 22 is provided with a shaped tool 37 which has the exact shape of the bore 15 which is to be finished. All the other electrodes are similarly provided with tooling. Mounted on the pulley 21 is a commutator drum 38 connected to a source of electrical power by a spring-biased brush 39 which is connected through the pulley 21 to the block 26. The block 26 is provided with a bolt 40 which is connected by a woven copper current-carrying strap 41 to a similar bolt 42 formed in the side of the electrode 22. The other electrodes 23, 24, and 25 are similarly connected to the copper block 26. Mounted on the drum 38 is a hydraulic commutator 43 for the electrolyte which is connected by various passages and a flexible hose 44 to passages in the electrode 22 leading to the face of the tooling where it lies opposite the bore 15. Similar flexible hose and passages lead to the operating faces of the other electrodes 23, 24, and 25. The interior of the spindle 17 is protected from the electrolyte and the machining operation by a bellows 45 which surrounds the electrode 22 and permits it to have radial motion without exposure of the interior of the slot 27 in which it is mounted. The other electrodes are similarly provided with bellows. The cavity around each electrode is filled with a viscous oil to provide damping.

OPERATION

The operation of the apparatus will now be readily understood in view of the above discussion. The workpiece 14 is supported in the workhead 13 in the usual way and rotatably driven about the axis of revolution of the bore 15. Hydraulic fluid is not initially provided to the bellows 34 of the tool head 16, so that the tool 37 and its corresponding tools remain in an inward position and are capable of being introduced into the bore without touching the workpiece. The toolhead 16 is rotated and the electrolyte is introduced into the system through the commutator 43. It flows through its various passages in the pulley 21 and the spindle and the flexible hoses (such as the hose 44) to the faces of the electrode tools. It then flows into the spaces between the bore 15 and the tools. Electrical power from the source 46 flows through the brush 39 into the drum 38 and passes through the pulley and the block 26. The current flows then through the strap 41 to the electrode 22 and its tool 37 from which it acts on the electrolyte lying between the tool and the bore 15. Since the tool head 16 is insulated by an insulated plate 47 embedded in the base 11, there is no danger of the current shorting. As the electrolytic machining progresses, air is introduced through the port 36 into the bellows 34 thus actuating the electrodes and moving them radially outwardly toward the surface of the bore 15, so that the electro-chemical machining process continues.

In order to understand the advantages of the present invention, it is necessary to examine some of the theoretical aspects of ECM process. In order to develop formulas for the time required to remove stock, to eliminate unwanted initial taper, to round up and to erase tool marks and grooves, it is necessary to consider transients in the ECM process. Referring to FIG. 5 and 6, in the feed rate ECM process, the electrode or "tool" is fed radially with a velocity V. The initial electrolyte gap is $x_0$ and must be large enough to accommodate rough stock variations and initial runouts. The workpiece may also have initial taper and surface roughness as well as tool marks, all of which it is desired to remove. The dissolution of the metal does not immediately take place at the rate V. Therefore, two variables must be considered: the instantaneous film thickness or gap $x$ and the stock removed $y$. Equations relating to these variables with the time $t$ are developed, as will be explained hereinafter, and can be plotted in non-dimensional form. These non-dimensional plots can be used to determine the stock removed at time $t$, the taper at time $t$, and the residual tool mark roughness at time $t$. In order to obtain some idea of the rate of cutting, an example may be used. A bore 1.2" in diameter by ¾" long is machined with a ⅛" wide electrode using a maximum current density of 3750 amps./inch $^2$, which is well under the 6000 amps./inch $^2$, which is the maximum permissible current recommended by experts in the field. The 3750 amps./inch $^2$ occurs at a gap of .0008". The feed velocity corresponding to this gap is .0002"/second. The steady state current is 350 amps. The above figures seem to be reasonable for today's state of the art. Using these figures and the dimensionless plot mentioned above, the instantaneous values of gap $x$ and stock removal $y$ can be plotted for two values of the initial gap $x_0$. Because of stock variations and runout, it is necessary to consider initial radial gaps in the order of .008 to .003". From the dimensionless plot it is found that it requires 30 to 60 seconds for the gap to reach its steady state value depending on the initial gap $x_0$. It will also be seen that 36 to 59 seconds is required to remove .005" of stock (.010" on diameter). Thus, the process described above is not fast enough to compete with conventional abrasive grinding operation. Excessive time would be consumed before the steady state gap is reached.

In view of the above, it appeared to be necessary to eliminate the transient period and to cause the electrode to work down to the steady state gap very quickly. This, according to the present invention, appears to be possible by using a free-floating "inertia-dominated" electrode which will immediately locate itself on the work regardless of the stock variation. The principles of eliminating the gap and of rounding up are similar to those used in the so-called "controlled-force" grinding process. By mounting the electrode on a frictionless structure whose natural frequency is greater than the work speed, a rapid rounding-up action and rapid elimination of the initial gap may be achieved. The electrode can be designed as a hydrostatic bearing using the electrolyte pressure and flow. In this way, the electrode can "locate" itself on the workpiece at a gap governed by the hydrostatic bearing pressures.

The schematic arrangement shown in FIG. 8 indicates a hydrostatic electrode with ceramic protection against short circuits. The ceramic overhangs the electrode and prevents momentary short circuits. With a 21 p.s.i. supply of electrolyte, the force on the electrode is 12.8 lbs. With the hydrostatic electrode located in the workpiece and with a steady state gap of .0008" immediately produced, a cutting speed of .0002"/sec. will result. Thus, it will require about 50 seconds to remove .020" on diameter, which is still slow compared with grinding. However, when several electrodes are operated on the workpiece simultaneously in accordance with the present invention, the situation changes. According to the present invention, four electrodes are used and engaged by small frictionless pistons which urge the electrodes against the workpiece with forces in the neighborhood of 12 lbs. With this setup, a .020" on diameter stock can be removed in 12 seconds and thus a fast cycle can be obtained. Since the force between the electrode and the work is small in comparison to the forces encountered in abrasive grinding, the work may be mounted directly on a magnetic chuck. For instance, a typical ball bearing race when held on a magnetic chuck requires 16 to 22 lbs. to slide. In the manufacture of bearing races, for instance, it would seem that a great deal of problem would be avoided with regard to concentricity, if the outside diameter of the bearing were machined in the same chucking operation as the inside diameter. The apparatus, according to the present invention, would permit external work to be done on the bearing race at the same time as the internal surface, if a magnetic chuck were used. Thus, it might be that machines could be used on which both the OD final finishing operation and the ID final finishing operation would be performed simultaneously. The problem of "rounding up" for an inertia-dominated system is discussed below. The numerical example treated was worked out for an inertia-dominated system and the results can be plotted. For a bore with an initial runout of .0072" the rounding-up curves can be shown for a four electrode system. With the four electrode system, the initial runout can be reduced to insignificant levels in about 15 seconds. The stock removal curve showed .010" stock removed in 12 seconds.

It is clear from the above discussion that, for a single electrode under simple feed rate control, the time required to remove .010" on diameter of stock is in the order of 50 seconds. However, considerable reduction in time can be achieved by a gap elimination procedure in order to avoid the transient conditions prevailing before the steady state. This can be accomplished very simply by mounting the electrode in an inertia-dominated system and running the work speed higher than the natural frequency of the system. The stock removal rate for a single electrode, even after elimination of transients, is still low compared to abrasive grinding techniques, so that two to four electrodes operating simultaneously appear to be necessary with the ECM process to reach the same rates as is found in abrasive grinding. Due to the low electrode forces, it appears possible to hold the work on magnetic chucks thereby permitting ID and OD operations to be performed at the same time.

Rounding up workpieces

According to W. A. Haggerty, the relation between depth of cut $h$ and workspeed $n$ is $$h = \frac{lI}{2\pi RnK} \qquad \text{Eq. (1)}$$

where (referring to FIG. 3):

$l$=length of tool (in.)
$I$=current density amp./in.$^2$
$2\pi Rn$=the work surface speed
$K$=an electrochemical factor depending on valence, density and Faraday's Constant (equals about 10,000 amp./in.$^3$/min. for steel)
$x$=instantaneous gap (in.)

For clean, turbulent flowing, electrolyte at 300 p.s.i. values of $I$=6000 amp./in.$^2$ seem to be permissible for narrow tools ($l$=$\frac{1}{16}$ in.)

For constant voltage supply:

$$i = \frac{E}{|R|} = \frac{E}{\frac{\rho x}{lw}}$$

or $$I = \frac{i}{lw} = \frac{E}{\rho x} \qquad \text{Eq. (2)}$$

Then $$h = \frac{lE}{2\pi RnK\rho} \frac{1}{x} = \frac{A}{x} \qquad \text{Eq. (3)}$$

Eq. (3) may also be written as $$V = nh = \frac{nA}{x} \qquad \text{Eq. (4)}$$

where V is the plunge velocity. From this equation there corresponds a steady state gap width $x$ for each plunge feed rate V.

Consider internal "grinding" of a workpiece with runout, with instantaneous gap $x$ and initial runout $\alpha$ (see FIG. 4):

The gap at any time $t$ is given by $$x(t) = x(t-\tau) - V\tau + h(t) \qquad \text{Eq. (5)}$$

writing this in terms of discrete revolutions gives:

$$x_n = x_{n-1} - V\tau + h_{n-1} \qquad \text{Eq. (6)}$$

Using a recurrence type of analysis we get:
Gap for 1st rev. $x_1 = \xi_1 + \alpha_1 \sin 2\pi nt$
Depth of cut 1st rev.

$$h_1 = \frac{A}{x_1}$$

Since the depth of cut $h$ is exactly out of phase with the gap $x$, the position of the high spot will not move relative to the workpiece. It will also be convenient to deal only with maximum and minimum values thus:

$$x_{1\,max.} = \xi_1 + \alpha_1$$

$$x_{1\,min.} = \xi_1 - \alpha_1$$

$$h_{1\,max.} = \frac{A}{x_{1\,min.}} = \frac{A}{\xi_1 - \alpha_1}$$

$$h_{1\,min.} = \frac{A}{x_{1\,max.}} = \frac{A}{\xi_1 + \alpha_1}$$

For the 2nd revolution:

$$x_{2\,max.} = x_{1\,max.} - V\tau + h_{1\,min.} = \xi_1 + \alpha_1 - V\tau + \frac{A}{\xi_1 + \alpha_1}$$

or $$\frac{x_{2\,max.}}{\xi_1} = 1 + \frac{\alpha_1}{\xi_1} + \frac{\frac{A}{\xi_1}}{\xi_1 + \alpha_1} - \frac{V\tau}{\xi_1}$$

If the feed velocity V is chosen to maintain the average gap $\xi_1$ constant, the quantity $$\frac{V\tau}{\xi_1} = 1$$

and there results $$\frac{x_{2\,max.}}{\xi_1} = \frac{\alpha_1}{\xi_1} + \frac{\frac{A}{\xi_1^2}}{1 + \frac{\alpha_1}{\xi_1}}$$

Similarly:

$$\frac{x_{2\,min.}}{\xi_1} = -\frac{\alpha_1}{\xi_1} + \frac{\frac{A}{\xi_1^2}}{1 - \frac{\alpha_1}{\xi_1}}$$

The runout during the 2nd revolution is $$\alpha_2 = \frac{x_{2\,max.} - x_{2\,min.}}{2}$$

From the above equations $$\frac{\alpha_2}{\xi_1} = \frac{\alpha_1}{\xi_1} - \frac{2\frac{\alpha_1}{\xi_1}A}{\left[1 - \left(\frac{\alpha_1}{\xi_1}\right)^2\right]\xi_1^2}$$

or $$\alpha_2 = \alpha_1 \left\{ 1 - \frac{\frac{2A}{\xi_1^2}}{1 - \left(\frac{\alpha_1}{\xi_1}\right)^2} \right\}$$

Since the runout for one revolution may be considered the initial runout for the next revolution:

$$\alpha_3 = \alpha_2 \left\{ 1 - \frac{\frac{2A}{\xi^2}}{1 - \left(\frac{\alpha_2}{\xi_1}\right)^2} \right\} \qquad \text{Eq. (8)}$$

Thus, the runout can be found by successive computation using the recurrence formula:

$$\alpha_n = \alpha_{n-1} \left\{ 1 - \frac{\frac{2A}{\xi_1^2}}{1 - \left(\frac{\alpha_{n-1}}{\xi_1}\right)^2} \right\} \qquad \text{Eq. (9)}$$

Since $$\frac{\alpha_{n-1}}{\xi_1} \to 0$$

an optomistic value of runout will be obtained by replacing $$\frac{\alpha_{n-1}}{\xi_1} \text{ by } \frac{\alpha_1}{\xi_1}$$

in the denominator of Equ. (9) thus:

$$\alpha_n \equiv \alpha_{n-1} \left\{ 1 - \frac{\frac{2A}{\xi^2}}{1 - \left(\frac{\alpha_1}{\xi_1}\right)^2} \right\} \qquad \text{Eq. (10)}$$

Consequently:

$$\alpha_n = \alpha_1 \left\{ 1 - \frac{\frac{2A}{\xi_1^2}}{1 - \left(\frac{\alpha_1}{\xi_1}\right)^2} \right\}^{n-1}$$

Example: Consider a 1 inch dia. bore under the following conditions:

Length of tool: $l=.062$ in.
Initial runout: $2\alpha_1=.005$ in. T.I.R.
Diameter: $2R=1.00$ in.
Width of workpiece: $w=.75$ in.
Stock to be removed on dia.$=.015$ in.
Work speed: $n=125$ r.p.m.
ECM constant: $K=10,000$ amp./in.$^3$/min.

Because runout is $\pm.0025$ in., we will take the average gap $$\xi_1=.0035$$

Hence, $$x_1 \text{ min.}=.001 \text{ in.}$$
$$x_1 \text{ max.}=.006 \text{ in.}$$

Set the current density to 6,000 amps./in.$^2$ at $x_1=.001$ in. Since $$I=\frac{E}{\rho x}$$

$$\frac{E}{\rho}=6,000 \times .001=6.0$$

Substituting in Equ. (3) gives:

$$h=\frac{.062 \cdot 6.0}{390 \cdot 10000 \cdot x}=\frac{.095 \cdot 10^{-6}}{x}=\frac{A}{x}$$

For $x_{avg}=.0035$ $h=27 \cdot 10^{-6}$ in./rev. or a plunge feed rate (Equ. 4) of $V=nh=.00338$ in./min.

By using Equ. (9) and successive computation gives the following values of runout:

| Revolution | Runout | Round-up ratio $\alpha_{i+1}/\alpha_i$ |
| --- | --- | --- |
| 1 | .0025 | |
| 2 | .00242 | .9685 |
| 3 | .00234 | .9706 |
| 4 | .00228 | .9721 |
| 5 | .00222 | .9733 |
| 6 | .00216 | .9742 |
| 7 | .00210 | .9751 |
| 8 | .00206 | .9759 |
| 9 | .00201 | .9764 |
| 10 | .00196 | .9770 |
| 11 | .00192 | .9775 |
| 12 | .001878 | .9780 |
| 13 | .001837 | .9784 |
| 14 | .001795 | .9788 |
| 15 | .001759 | .9791 |
| 16 | .001720 | .9794 |
| 17 | .001683 | .9797 |
| 18 | .001650 | .9800 |
| 19 | .001620 | .9802 |
| 20 | .001590 | .9804 |
| 21 | .00156 | .9806 |
| 22 | .00153 | .9808 |
| 23 | .00150 | .9810 |
| ↓ | | |
| ∞ | | .985 |

Transients in ECM process

From FIG. 6:

$$x=x_0-Vt+\int_0^t \frac{dy}{dt} dt \qquad \text{Eq. (1)}$$

From the Haggerty Equation:

$$h=\frac{lE}{2\pi R n K \rho} \frac{1}{x} \qquad \text{Eq. (2)}$$

$$=\frac{B}{nx} \text{ where } B=\frac{lE}{2\pi R K_\rho}$$

Then $$\frac{dy}{dt}=nh=\frac{B}{x}$$

Equation 1 becomes $$x=x_0-Vt+\int_0^t \frac{B}{x} dt \qquad \text{Eq (3)}$$

Differentiating Eq. (3) with respect to $t$ $$\frac{dx}{dt}=-V+\frac{B}{x}$$

or $$\frac{x dx}{B-V_x}=dt \qquad \text{Eq. (4)}$$

Integrating gives $$\frac{1}{V^2}[B-Vx-B\ln(B-Vx)]=t+C \qquad \text{Eq. (5)}$$

Initial Condition is: $t=0$, $x=x_0$
Then $$C=\frac{1}{V^2}[B-Vx_0-B\ln(B-Vx_0)] \qquad \text{Eq. (6)}$$

Equation 5 becomes $$\frac{Vt}{x_0}=1\frac{x_s}{x_0}+\frac{x_s}{x_0}\left[\ln\frac{1-\frac{x_0}{x_s}}{1-\frac{x_0}{x_s}\frac{x}{x_0}}\right] \qquad \text{Eq. (7)}$$

where $$x_s=\frac{B}{V} \text{ (the steady state gap)}$$

The stock removed $y$ is $$y=Vt+x-x_0$$

$$\frac{y}{x_0}=\frac{x_s}{x_0}\left[\ln\frac{1-\frac{x_0}{x_s}}{1-\frac{x_0}{x_s}\frac{x}{x_0}}\right] \qquad \text{Eq. (8)}$$

Numerical example $$\frac{E}{\rho}=3 \text{ (6000 amp/in.}^2\text{ @ .0005 in gap)} \quad Ix=\frac{E}{\rho}$$

$$K=600000 \frac{\text{amp-sec.}}{\text{in}^3} \quad I_{ss}=\frac{3}{x_s}=3750$$

$R=.6$ in work radius $i_{ss}=I_{ss} \cdot l \cdot w$ $l=.125$ in electrode width $=3750 \times \frac{1}{8} \cdot \frac{3}{4}=350$ $$B=\frac{lE}{2\pi R K_\rho}=.0166 \times 10^{-5}$$

$x_s=.0008$ steady state gap $$V_{ss}=\frac{B}{x_s}=.000208 \text{ in./sec.}$$

$$x_0=\begin{cases}.0008\\.0032\end{cases}\begin{matrix}\text{max.}\\\text{min.}\end{matrix} \quad \text{Initial gap } \frac{x_0}{x_s}=10$$

$$\frac{x_0}{x_s}=4$$

Rounding up under an inertia dominated system

Referring to FIG. 7:
The electrode moves with workspeed $v$. The mass is so high that the electrode locates on peaks and does not fall appreciably into valleys.

The plunge velocity $$V=nh_1=\frac{B}{x_1}$$

The steady state gap $x_s$ exists from the start at the high point.

The runout $\rho(t)$ is $$\rho(t)=\rho_0-[y_1(t)-y_2(t)]$$

$$\frac{\rho}{\rho_0}=1-\left[\frac{y_1}{\rho_0}-\frac{y_2}{\rho_0}\right]$$

$y_1$ may be computed from $y_1=V_s t$
$y_2$ may be found from FIG. 10 for $x_0=\rho_0+x_1$ Hydrostatic electrode with short circuit protection
and downstream flushing Referring to FIGS. 8 and 9:

Workspeed=3600 r.p.m.

$$v = 1.2\pi \cdot 60 = 226 \text{ in./sec.}$$

For $P_s = 200$ p.s.i.

$$F = Ap = [.062 \times 100 + 50(.225)].75 = 12.8 \text{ lbs.}$$

$$Q = \frac{h^2 sP}{12\mu t} = \frac{(.0008)^3 \times .75 \times 100}{12 \times .1 \times 10^{-6} \times .125} = .255 \text{ in.}^3/\text{sec.}$$

$$\mu = \frac{h^2}{8\mu}\left[1 - 4\left(\frac{y}{h}\right)^2\right]\frac{dp}{dx}$$

$$\mu_{max.} = \frac{h^2}{8\mu}\frac{dp}{dx} = \frac{(.0008)^2}{8 \times .1 \times 10^{-6}}\frac{\frac{100}{1}}{8} = 640 \text{ in./sec.}$$

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Apparatus for the generation of a surface of revolution on a workpiece by the electro-chemical process, comprising:
   (a) a base,
   (b) a tool holder mounted on the base,
   (c) a workpiece holder mounted on the base,
   (d) means bringing about relative rotation between the tool holder and the workpiece about the axis of the surface of revolution,
   (e) a plurality of electrode systems mounted on the tool holder in a group lying on an imaginary cylinder concentric with the said axis,
   (f) means for pressing the electrode systems outwardly toward the surface, the electrode systems having dynamic properties such that the natural frequency is equal to or less than the speed of the said relative rotation to produce an inertia-dominated system, so that the electrode systems do not move toward or away from the surface in response to irregularities in the unfinished condition of the surface, and
   (g) an elongated reed on which each electrode system is mounted extending parallel to the axis of revolution, the natural frequency of the reed and electrode system differing substantially from pressure pulses in the electrolyte due to irregularities in the said surface.

2. Apparatus as recited in claim 1, wherein the means operates to press the electrodes toward the surface with a constant predetermined force.

3. Apparatus as recited in claim 1, wherein each electrode is formed with a cylindrical surface facing toward the said surface and of approximately the same radius of curvature as the said surface.

4. Apparatus as recited in claim 1, wherein a flexible hose connects each electrode to the spindle for providing an electrolyte to the electrode.

5. Apparatus as recited in claim 1, wherein a copper block is mounted in the spindle and is provided with radial slots in which the electrodes are mounted for radial movement.

6. Apparatus as recited in claim 1, wherein the electrodes extend axially from one end of the spindle and wherein each electrode is connected to the spindle by a flexible boot to prevent access by electrolyte to the interior of the spindle.

7. Apparatus as recited in claim 1, wherein the said means consists of a pneumatic bellows associated with each electrode.

8. Apparatus as recited in claim 1, wherein the said means for pressing operates resiliently, and wherein the mass of the electrode combined with the said means for pressing and the said reed results in a natural frequency which differs substantially from the frequency of relative rotation between the spindle and the workpiece.

9. Apparatus as recited in claim 1, wherein each electrode system includes a damping means.

References Cited

UNITED STATES PATENTS

| | | | |
|---|---|---|---|
| 3,256,755 | 6/1966 | Kraus | 77—58 |
| 3,267,018 | 8/1966 | Greening | 204—224 |
| 3,287,245 | 11/1966 | Williams | 204—224 |
| 3,313,715 | 4/1967 | Schwartz Jr. | 204—26X |
| 3,390,068 | 6/1968 | Ellis et al. | 204—143X |
| 3,399,125 | 8/1968 | Mikoshiba et al. | 204—143 |
| 3,405,049 | 10/1968 | Czubak | 204—217 |

ROBERT K. MIHALEK, Primary Examiner

W. B. VANSISE, Assistant Examiner

U.S. Cl. X.R.

204—26, 143, 225